Aug. 12, 1958   J. H. ALTSEIMER   2,847,148
FLUID PRESSURE OPERATED DISPENSING DEVICE
Filed Aug. 4, 1955   2 Sheets-Sheet 2

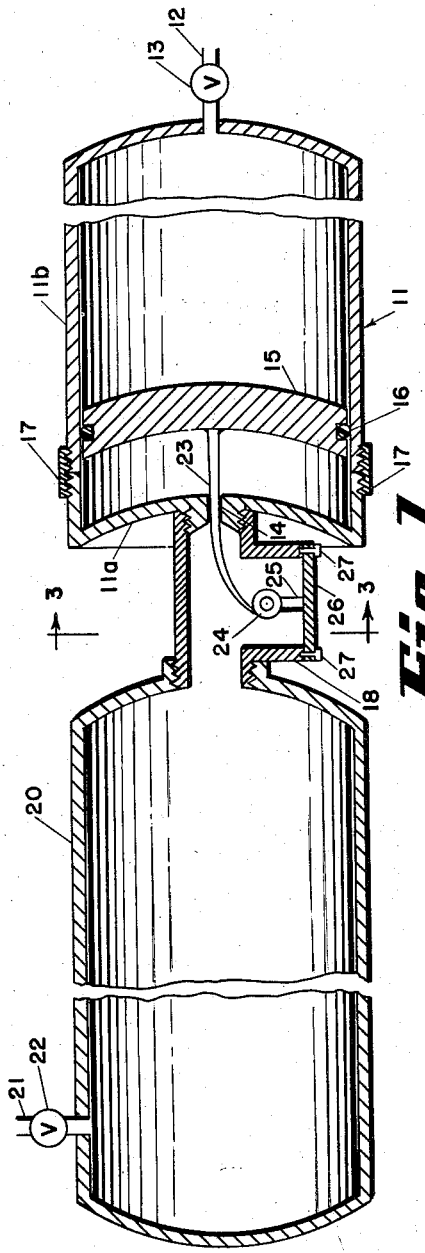
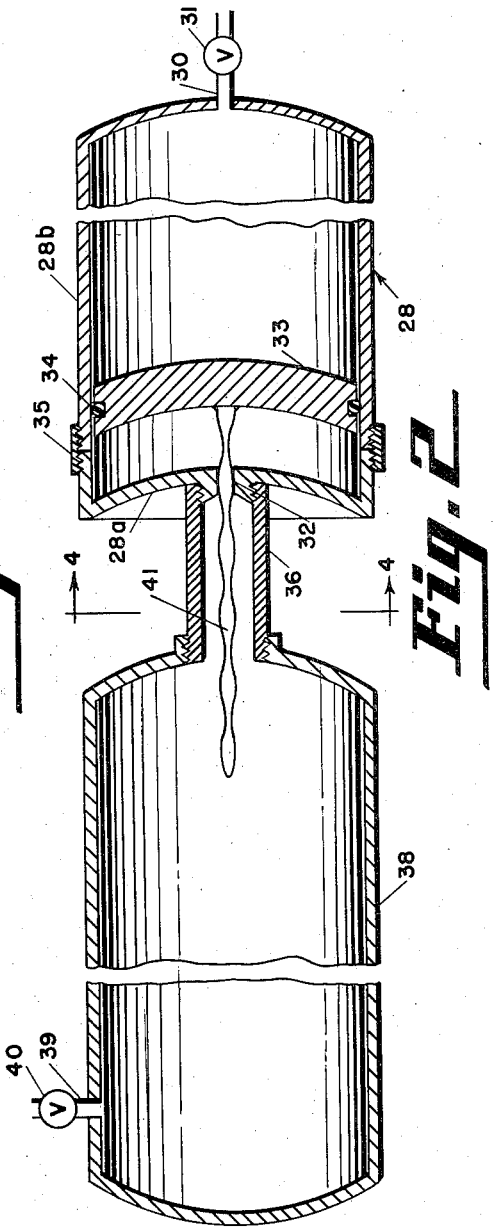

INVENTOR.
J. H. ALTSEIMER
BY
ATTORNEY

United States Patent Office 2,847,148
Patented Aug. 12, 1958

2,847,148

FLUID PRESSURE OPERATED DISPENSING DEVICE

John H. Altseimer, Pomona, Calif., assignor to Aerojet-General Corporation, Azusa, Calif., a corporation of Ohio Application August 4, 1955, Serial No. 526,430

10 Claims. (Cl. 222—389)

This invention relates to a device for programming the rate of fluid flow from a piston operated liquid tank.

An object of this invention is to provide a simple apparatus for regulating the rate of fluid flow from a liquid reservoir.

Another object of this invention is to provide a simple light weight and automatic means for regulating the flow of liquid fuels and oxidizers into the combustion chamber of a rocket engine.

Liquids such as lubricants, fire extinguishing fluids, jet fuels, rocket fuels, rocket oxidizers, and the like, are commonly stored in tanks. Such tanks are commonly provided with a piston and a source of gas or hydraulic pressure whereby the piston can be moved so as to pump the fluids out of the chamber.

For example, in a liquid bi-propellant rocket system, the fuel and oxidizer are stored in separate compartments. Conduit from each compartment is connected to an injector leading into the combustion chamber. In operation, the fuel and oxidizer are pumped under high pressure into the combustion chamber through the igniter where ignition and combustion occurs, thus generating propulsive force. Perhaps the most convenient means for pumping these fluids is to provide a gas operated piston in each chamber. When gas under high pressure is introduced behind such pistons, the piston is moved and the fluids expelled under high pressure. When the gas source in such a system is a tank full of liquefied gas, such as helium, it it at once apparent that as the fuel and oxidizer are pumped, the pressure of the gas must necessarily drop. This results in a highly undesirable variation in the rate of flow of both the fuel and the oxidizer to the combustion chamber, hence it is necessary to provide some means for programming the rate of flow so as to render it constant from the beginning to the end of the operation. In addition, it will also be appreciated that in many instances it is desirable to vary the flow of fuel and oxidizer during operation so as to very the amount of thrust produced in a specific manner.

The apparatus of this invention provides a simple means for programming the rate of flow of such pressure operated piston pumping systems. The invention will be better understood from the following detailed description and the accompanying drawings, of which:

Fig. 1 is an elevation of a fluid ejection system according to the invention;

Fig. 2 is an elevation of a modification of the invention;

Figure 3:
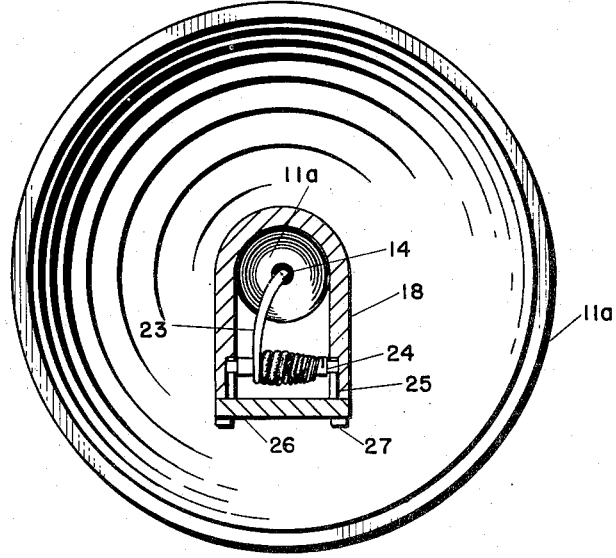
Fig. 3 is a cross-sectional view along the line 3—3 of Fig. 1.

Referring to Figs. 1 and 3, I have shown a fluid pumping system in which the rate of fluid pumping can be regulated in accordance with my invention. There is provided a fluid storage chamber 11 for holding the fluid which is to be pumped. The chamber 11 is preferably, for reasons of convenience and access, constructed in two sections, 11a and 11b, which are threaded together by a band 17. At one end of the chamber there is provided an outlet conduit 12 regulated by a valve 13. In use, as for example in a rocket motor, the conduit 12 would ordinarily lead to the injector. Inside the chamber 11 there is provided a piston 15, free to move laterally in the chamber, which is provided with a seal 16 to isolate gases or fluids on either side of the piston. Behind the piston and in the section 11a of the chamber there is provided an orifice 14. Around the orifice 14 is threaded a conduit section 18. A spool 24, mounted on a support 25, is attached to a closing member 26 in the section 18. A flexible rod of variable cross section is welded to the back of the piston 15, passed through the orifice 14 and wound around the spool 24. The closing member 26 is provided merely as a convenience for access to the spoon, and is attached to the conduit section 18 by bolts 27. A pressure bottle or chamber 20 is threaded to the conduit section 18. The chamber 20 is provided with a conduit 21 and a valve 22 to permit pressurization or charging of the vessel.

In operation, high pressure is introduced into the tank 20 whereupon the high pressure gases pass through the inlet 14 and move the piston 15, thus expelling fluids contained in the tank 11. As the piston moves forward, the rod 23 is drawn off the spool and pulled through the inlet 14. Since the rod 14 has a variable cross section, the open area of the inlet 14 will diminish or increase depending upon the diameter of that portion of the rod which is passing through the inlet. As the open area of the inlet 14 increases and decreases, the amount of pressurized gas admitted to the space behind the piston correspondingly increases or decreases, thereby regulating the rate of movement of the piston and thus regulating the rate of fluid expulsion.

Figure 4:
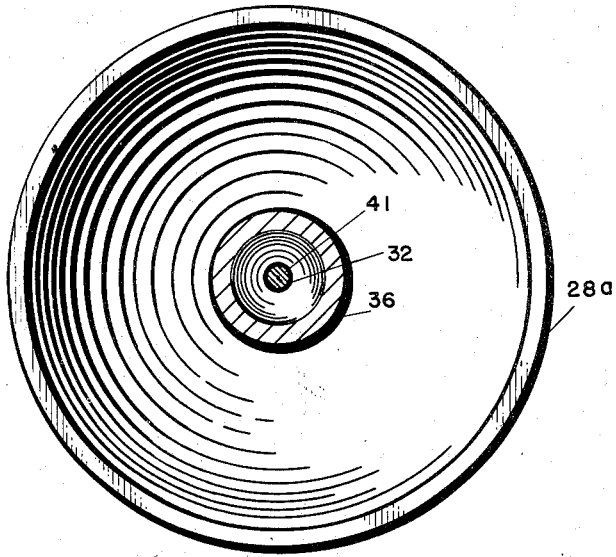
Fig. 4 is a cross-sectional view along the line 4—4 of Fig. 2.

Referring now to Figs. 2 and 4, there is shown a fluid storage chamber 28 constructed in two sections, 28a and 28b, which are threaded together by a band 35. At one end of the chamber 28 there is provided an outlet conduit 30 which can be regulated by a valve 31. Inside the chamber 28 there is provided a piston 33, and sealing member 34 for the piston. Behind the piston 33 and in the section 28a there is provided an orifice 32. A conduit section 36 is threaded around the orifice 32 and a pressure bottle or chamber 38 is threaded to the conduit 36. It will be appreciated that the conduit 36 can be omitted and the pressure bottle threaded to the orifice 32. A rod of variable cross section 41 is enclosed within the conduit section 36. The rod 41 passes through the orifice 32 and is welded to the piston 33. A conduit 39, and regulating valve 40 for the conduit 39, is provided in the pressure chamber 38 to permit pressurization.

In operation, the tank 38 is pressurized and the valve 31 opened. Pressurized gases from the tank 38 pass through the inlet 32 into the chamber 28, thereby moving the piston 33 and expelling the enclosed liquids. Movement of the piston 33 draws the rod 41 through the inlet orifice 32. This causes the effected inlet opening to vary as the diameter of the rod 41 increases and decreases which in turn regulates the amount of pressurized gas entering in the inlet 32 which in turn regulates the rate of liquid expulsion from the tank 28.

It will be appreciated that the cross section area of the rod or spool members illustrated in Figs. 1 and 2 can be varied in any manner desired, and hence the fluid expulsion can be caused to pulse, increased toward the end of operation or perform in any other manner desired.

It will also be appreciated that the programming apparatus described herein is not limited to the ejection or pumping of liquid rocket propellant and oxidizers. This apparatus can be used in any system embodying a gas pressure operated piston.

It should also be appreciated that the system illustrated in Fig. 2 can be reversed in which case the piston can be moved in the opposite direction by a constant force and the fluid or liquid expelled through the inlet which would then be the outlet 32, so as to regulate the fluid flow at that point.

In addition, it will be seen that this apparatus can be used with hydraulic systems in place of pressurized gas. In such systems, the operation and apparatus is identical to that described.

Moreover, this apparatus can be used for purposes other than the pumping of fluids, as for example by mechanically linking the piston so as to translate its motion into variable direct linear movement. Many other modifications of the invention will suggest themselves to those skilled in the art, and I therefore limit my invention only to the appended claims.

I claim:

1. A piston programming apparatus which comprises in combination a fluid chamber having an outlet orifice and an inlet orifice, piston means enclosed within said chamber adapted to isolate fluids on either side of said piston, a rod of varying cross section along a substantial length of said rod attached to said piston and passing through one of said orifices, and pressure means in communication with one of said orifices the cross sectional area of said rod being smaller than the cross sectional area of the said orifice through which it passes along the entire length of said rod.

2. A fluid pumping apparatus which comprises in combination a fluid chamber having an outlet orifice and an inlet orifice, piston means enclosed within said chamber adapted to isolate said orifices and fluids on either side of said piston, a rod of varying cross section along a substantial length of said rod attached to said piston and passing through said inlet orifice, and a source of pressurized fluid in communication with said inlet orifice the cross sectional area of said rod being smaller than the cross sectional area of the said orifice through which it passes along the entire length of said rod.

3. A fluid pumping apparatus which comprises in combination a fluid chamber having an outle orifice and an inlet orifice, piston means enclosed within said chamber adapted to isolate said orifices and fluids on either side of said piston, a rod of varying cross section along a substantial length of said rod, attached to said piston and adapted to pass through said outlet orifice as said piston is moved, and a source of pressurized fluid in communication with said inlet orifice the cross sectional area of said rod being smaller than the cross sectional area of the said orifice through which it passes along the entire length of said rod.

4. Fluid pumping apparatus which comprises in combination a liquid chamber having an inlet orifice at one end and an outlet orifice at its opposite end, piston means enclosed in sealing engagement within said liquid chamber adapted to isolate orifices, a rod of varying cross section along a substantial length of said rod attached to said piston, said rod being passed through said inlet orifice and adapted to move as said piston is moved, and a chamber of pressurized gas in communication with said inlet orifice the cross sectional area of said rod being smaller than the cross sectional area of the said orifice through which it passes along the entire length of said rod.

5. A piston programming apparatus which comprises in combination a fluid chamber having an outlet orifice and an inlet orifice, piston means enclosed within said chamber adapted to isolate fluids on either side of said piston, a flexible rod of variable cross section along a substantial length of said rod attached at one end to said piston and passing through one of said orifices, a spool mounted outside said fluid chamber and on which the other end of said flexible rod is wound, and pressure means in communication with one of said orifices the cross sectional area of said rod being smaller than the cross sectional area of the said orifice through which it passes along the entire length of said rod.

6. Fluid pumping apparatus which comprises in combination a liquid chamber having an inlet orifice at one end and an outlet orifice at its opposite end, piston means enclosed in sealing engagement within said liquid chamber adapted to isolate said orifices a flexible rod of varying cross section along a substantial length of said rod attached to said piston, said rod being passed through said inlet orifice and adapted to move as said piston is moved, the cross sectional area of said rod being smaller than the cross sectional area of the said orifice through which it passes along the entire length of said rod, a chamber of pressurized gas in communication with said inlet orifice, a conduit passage connecting said chamber of pressurized gas and the inlet orifice of said liquid chamber, and spool means mounted within said conduit around which is wound the unatached end of said rod.

7. An automatic fluid programming apparatus comprising: a chamber having an inlet orifice, piston means enclosed within said chamber and displaced in said chamber by fluid under pressure introduced through said inlet orifice, an elongate control member of varying cross section a substantial length of said member attached at one end to said piston and projecting through said inlet orifice to vary the cross section thereof during movement of the piston the cross sectional area of said member being smaller than the cross sectional area of the said orifice through which it passes along the entire length of said member, and a source of pressure fluid connected to said inlet orifice.

8. An automatic fluid programming apparatus, comprising: a fluid chamber; piston means enclosed within said chamber; orifices in the wall of the chamber on opposite sides of and separated by said piston; means for supplying fluid under pressure to one of said orifices; an elongate control member of varying cross section a substantial length of said member attached at one end to said piston and passing through one of said orifices to vary the cross section of the opening thereof during movement of the piston the cross sectional area of said member being smaller than the cross sectional area of the said orifice through which it passes along the entire length of said member and thereby control the discharge of fluid from the fluid chamber caused by movement of the piston under the force of pressure fluid supplied to said fluid chamber.

9. A fluid pressure operated device, comprising: a fluid chamber; an inlet orifice to said chamber; a piston enclosed within said chamber; means for supplying fluid under pressure to said inlet orifice; an elongate control member of varying cross section a substantial length of said member attached at one end to said piston and passing through said inlet orifice to vary the cross section of the opening thereof during movement of the piston the cross sectional area of said member being smaller than the cross sectional area of the said orifice through which it passes along the entire length of said member; and means acted on by the movement of said piston.

10. A fluid programming device, comprising: a fluid chamber having an inlet and an outlet orifice; piston means enclosed within said chamber and separating said orifices; an elongate control member of varying cross section a substantial length of said member attached at one end to said piston and extending through said inlet orifice to vary the cross section thereof during movement of the piston the cross sectional area of said member being smaller than the cross sectional area of the said orifice through which it passes along the entire length of said member; a chamber connected to the inlet orifice and containing a confined body of fluid under an initial pressure, the rate of delivery of said fluid under pressure to said fluid chamber, and the pressure thereof being controlled by the progressive movement of the piston; and fluid contained in said fluid chamber and discharged through said outlet orifice in accordance with the fluctuation in the rate and pressure of pressure fluid admitted to said chamber.

References Cited in the file of this patent

UNITED STATES PATENTS 2,273,125   McFarland _____ Feb. 17, 1942